United States Patent
Choi et al.

(10) Patent No.: US 9,313,723 B2
(45) Date of Patent: Apr. 12, 2016

(54) METHOD AND APPARATUS FOR EXECUTING AN APPLICATION BY USING A COMMUNICATION ADDRESS

(71) Applicant: SAMSUNG ELECTRONICS CO., LTD., Suwon-si, Gyeonggi-do (KR)

(72) Inventors: Juang-hwan Choi, Suwon-si (JP); Soon-hoon Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 14/104,362

(22) Filed: Dec. 12, 2013

(65) Prior Publication Data
US 2015/0049646 A1 Feb. 19, 2015

(30) Foreign Application Priority Data

Aug. 14, 2013 (KR) .......................... 10-2013-0096884

(51) Int. Cl.
*H04L 12/28* (2006.01)
*H04W 48/16* (2009.01)
*H04W 76/02* (2009.01)
*H04W 8/18* (2009.01)
*H04W 84/12* (2009.01)

(52) U.S. Cl.
CPC .............. *H04W 48/16* (2013.01); *H04W 76/02* (2013.01); *H04W 8/18* (2013.01); *H04W 84/12* (2013.01)

(58) Field of Classification Search
CPC ..... H04W 48/00; H04W 48/02; H04W 48/08; H04W 48/16; H04W 36/00; H04W 36/0005; H04W 36/0011; H04W 76/02; H04W 76/021
See application file for complete search history.

(56) References Cited

U.S. PATENT DOCUMENTS

| | | | |
|---|---|---|---|
| 2012/0033568 A1* | 2/2012 | Park ................... | H04W 76/023 370/252 |
| 2013/0304898 A1* | 11/2013 | Aggarwal ............ | H04W 4/023 709/224 |
| 2015/0043377 A1* | 2/2015 | Cholas ................. | H04W 16/00 370/254 |

FOREIGN PATENT DOCUMENTS

| | | |
|---|---|---|
| KR | 10-0857825 B1 | 9/2008 |
| KR | 10-2012-0008412 A | 1/2012 |
| KR | 10-2012-0013508 A | 2/2012 |
| WO | WO 2005/048475 A1 | 5/2005 |

* cited by examiner

*Primary Examiner* — Anh Ngoc Nguyen
(74) *Attorney, Agent, or Firm* — Drinker Biddle & Reath LLP

(57) ABSTRACT

A method and apparatus for executing an application by using a communication address may be implemented as terminal that includes a service providing unit that provides an application, and an IP address managing unit that assigns an IP address to the application. The terminal may also have a communication unit configured to operate as a Wi-Fi Host Access Point (AP) unit or as a Wi-Fi client unit. When the communication unit operates as a Wi-Fi Host AP unit, it uses the assigned IP address to carry out its WiFi host AP functions. When the communication unit operates as a Wi-Fi client unit, it searches for an accessible Wi-Fi Host AP, identifies a service set identifier (SSID) and an IP address of a Wi-Fi Host AP, and accesses the Wi-Fi Host AP.

13 Claims, 4 Drawing Sheets

METHOD AND APPARATUS FOR EXECUTING AN APPLICATION BY USING A COMMUNICATION ADDRESS

RELATED APPLICATIONS

This application claims the priority benefit under 35 U.S.C. §119(a) of Korean Patent Application No. 10-2013-0096884, filed on Aug. 14, 2013, in the Korean Intellectual Property Office, the disclosures of which are incorporated herein by reference in their entirety.

BACKGROUND

1. Field

One or more embodiments of the invention relate to a method for executing a function of an application on a terminal, and more particularly, to a method for executing a function of an application on terminal by using a communication address of a Host AP.

2. Description of the Related Art

Sharing data or applications between terminals has increased with technological developments in electronics, communication, and computers. However, for functions performed in a first terminal and a second terminal to be compatible and communication between them occur, a communication protocol needs to be installed in the first and second terminals. Alternatively, the existence of a communication protocol in the first and second terminal should be verified before the functions are performed. Also, if compatibility problems occur, such as transmission problems due to the communication protocol, sharing data or applications between the first and second terminals may become difficult.

SUMMARY

An embodiment of the invention provides a method for directly sharing data or applications between a first terminal and a second terminal without separately installing or checking a communication protocol in both the first terminal and the second terminal.

According to an embodiment of the invention, a terminal includes: a service providing unit that provides an application; an Internet Protocol (IP) address managing unit that assigns a distinct IP address identifying the application and stores mapping information regarding the application and its assigned IP address; and a communication unit configured to operate as a Wi-Fi Host Access Point (AP) unit or as a Wi-Fi client unit. When the communication unit operates as a Wi-Fi Host AP unit and the application is selected, the communication unit uses the IP address assigned to the application to perform a WiFi host AP function. When the communication unit operates as a Wi-Fi client unit, the communication unit searches for an accessible Wi-Fi Host AP; identifies a service set identifier (SSID) and an IP address of a Wi-Fi Host AP; and accesses the Wi-Fi Host AP.

The terminal may include an application executing unit. When the communication unit operates as a Wi-Fi client unit, and the accessed Wi-Fi Host AP uses an IP address that that the Wi-Fi client identifies as an IP address corresponding to an application, the application executing unit executes the application. When the communication unit operates as a Wi-Fi client unit, and the accessed Wi-Fi Host AP uses an IP address that that the Wi-Fi client unit does not identify as an IP address corresponding to an application, the terminal provides Wi-Fi communication.

The application may include at least one of a mobile link application, a remote view finder application, and an auto share application. Additionally, the application may be one of a number applications provided by the service providing unit, and the IP address managing unit may assign a distinct IP address to each of the applications.

According to another embodiment, a terminal includes: a service providing unit that provides an application; a communication address managing unit that assigns a distinct communication address identifying the application and stores mapping information regarding the application and its assigned communication address; and a communication unit configured to operate as a communication Host AP unit or as a communication client unit. When the communication unit operates as a communication Host AP unit and the application is selected, the communication unit uses the communication address assigned to the application to perform a Host AP function. When the communication unit operates as a communication client unit, the communication unit searches for an accessible communication Host AP; identifies communication identification addresses of communication Host APs from the results of the search; and accesses a certain communication Host AP.

The terminal may include an application executing unit. When the communication unit operates as a communication client unit, and the accessed communication host AP uses a communication address that that the communication client identifies as a communication address corresponding to an application, the application executing unit executes the application.

According to another embodiment, a system for executing an application installed in a terminal by using an IP address includes multiple terminals; a service providing unit that provides at least one application; and an IP address managing unit that assigns a distinct IP address identifying respective applications and stores mapping information regarding the application and the assigned IP address. A first terminal configures a Wi-Fi Host AP function by using an IP address corresponding to a particular application when that application is selected. At least one other terminal searches for an accessible Wi-Fi Host AP, accesses a particular Host AP after identifying an SSID and an IP address of the Wi-Fi Host AP. If the IP address managing unit has information regarding an application corresponding to the IP address, then the terminal accessing the Host Wi-Fi AP provides Wi-Fi communication while executing the application. The Host AP that is accessed may be a Wi-Fi Host AP configured by the first terminal.

The application may include at least one of a mobile link application, a remote view finder application, and an auto share application.

Another embodiment provides a method for automatically executing an application by using an Internet protocol IP address in a transmitting terminal and a receiving terminal. The transmitting terminal and the receiving terminal each include an IP address managing unit that provides at least one application configured to perform a certain task, supports Wi-Fi communication, assigns a distinct IP address identifying each of the applications and stores mapping information regarding the application and the assigned IP address. The method may include: selecting a certain application from at least one application provided by the transmitting terminal; searching for an IP address corresponding to the application selected in the transmitting terminal (in which the searching is performed by the IP address managing unit); configuring a Wi-Fi Host AP function by using the IP address identified by the search in the transmitting terminal; searching for an accessible Wi-Fi Host AP in the receiving terminal; accessing the configured Wi-Fi Host AP in the transmitting terminal after identifying a SSID and an IP address of the Wi-Fi Host AP from the search in the receiving terminal; and providing Wi-Fi communication while executing an application corresponding an IP address of the accessed Host AP, if the IP address managing unit has information related to the application corresponding to the IP address of the accessed Host AP.

The receiving terminal may be one of a plurality of receiving terminals.

The application may include at least one of a mobile link application, a remote view finder application, and an auto share application According to various embodiments, an application or a certain function performed in a first terminal may be identically performed in a second terminal without any time delay and additional compatibility problems regarding communication protocols between the first terminal and the second terminal.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
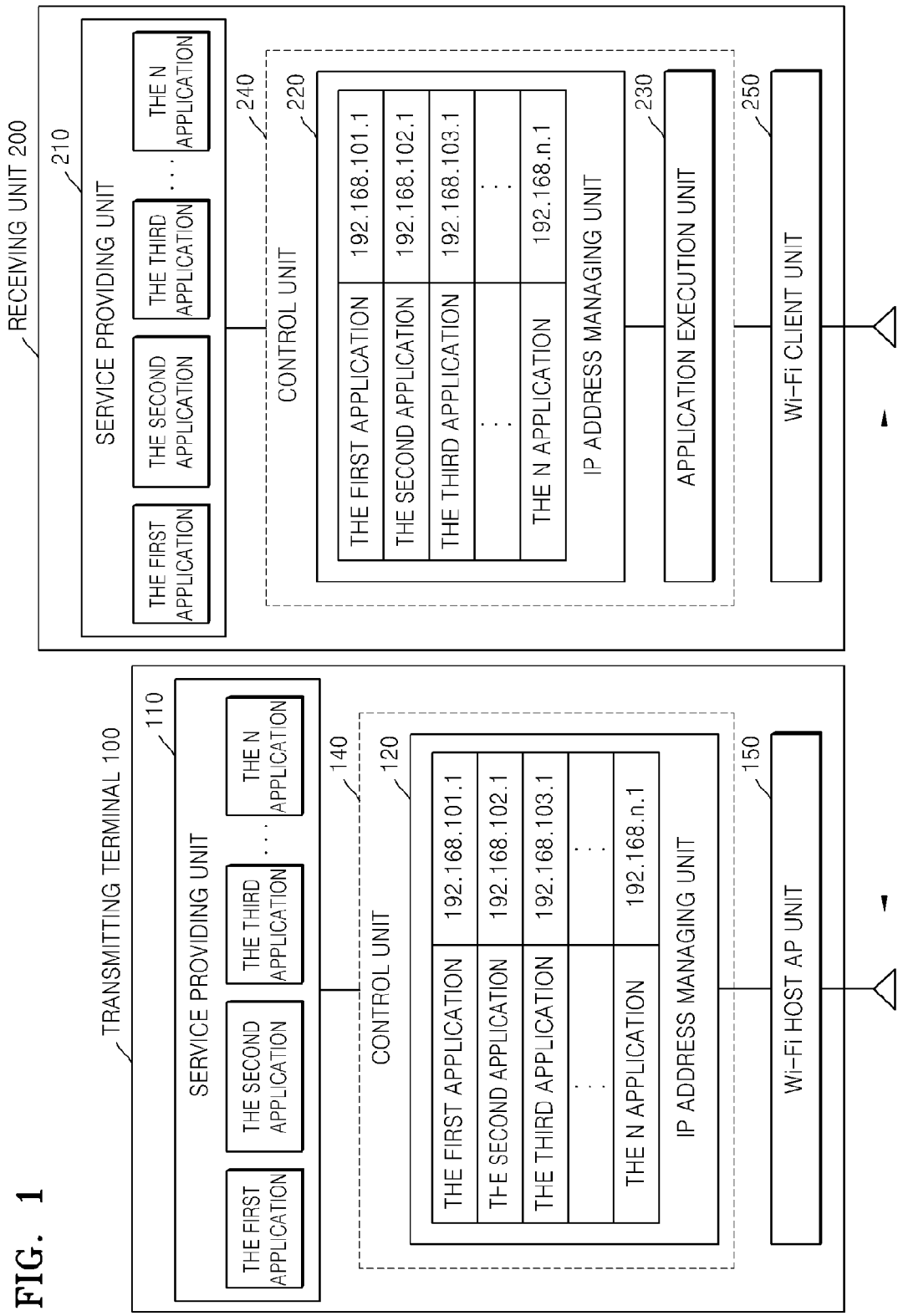
FIG. 1 is a schematic view of a system for automatically executing an application by using an Internet protocol (IP) address regarding a receiving terminal and a transmitting terminal, according to an embodiment.

Reference will now be made in detail to embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

Figure 2:
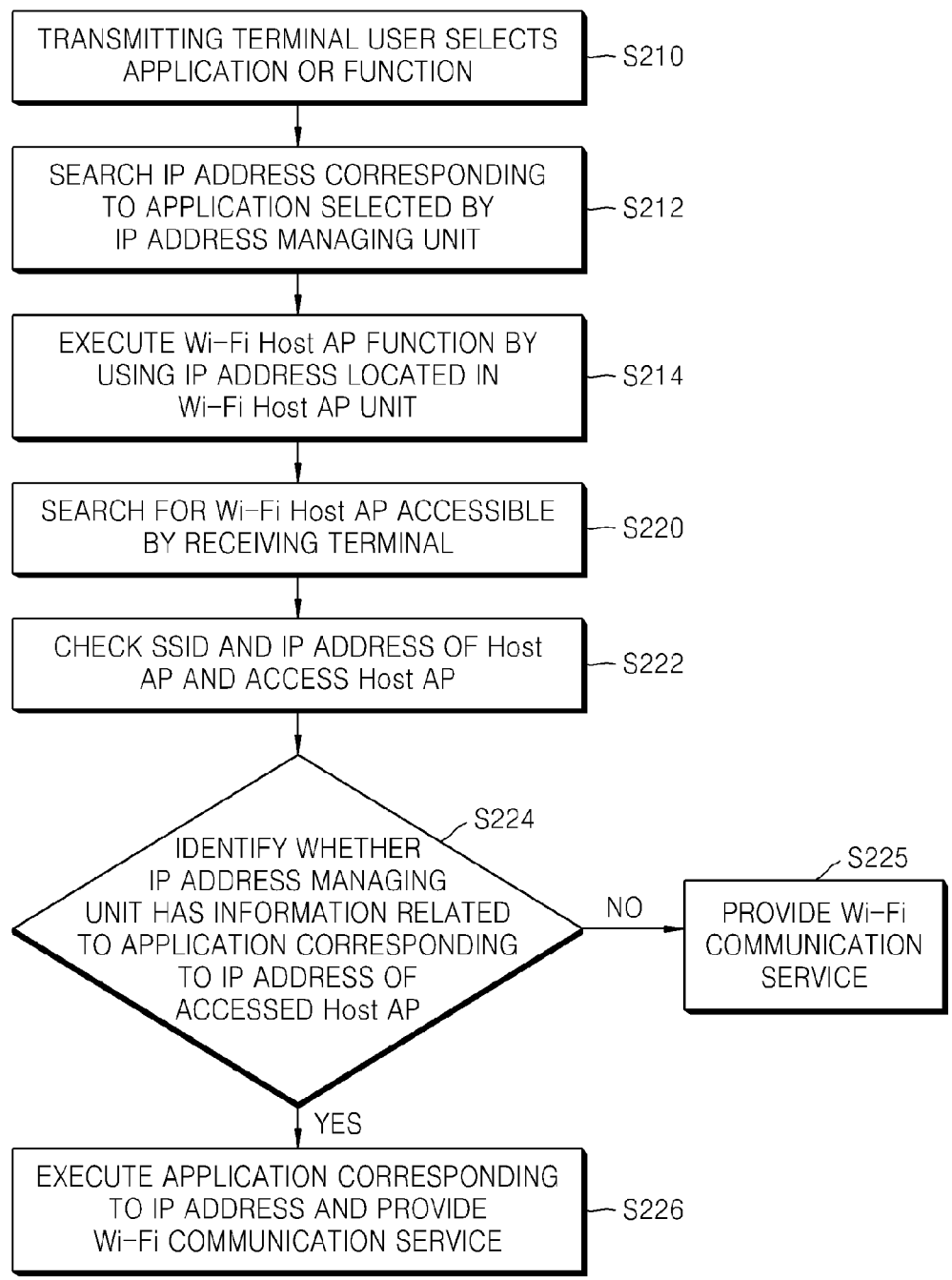
FIG. 2 is a flowchart illustrating a method for automatically executing an application by using an IP address regarding a receiving terminal and a transmitting terminal, according to an embodiment.

FIG. 1 is a schematic view of a system for automatically executing an application by using an IP address in a transmitting terminal 100 and a receiving terminal 200, according to an embodiment. FIG. 2 is a flowchart illustrating a method for automatically executing an application by using an IP address in the transmitting terminal 100 and the receiving terminal 200, according to an embodiment.

A detailed description in this regard will be given below with reference to FIGS. 1 through 2.

According to an embodiment, each of the transmitting terminal 100 and the receiving terminal 200 denotes a portable device having at least one function of performing voice and video calls, inputting and outputting information, and playing or producing multimedia. There may be one or more other terminals not shown in FIG. 1, which may have the same possible functions. The terminals listed above may also have complicated functions such as taking a picture, recording a video, playing music or a video clip, receiving a TV program or surfing the Internet, and are implemented as multimedia players.

Each of the transmitting terminal 100 and the receiving terminal 200 has a user interface to help a user search for or select a function easily and conveniently.

Possible implementations of the transmitting terminal 100 and the receiving terminal 200 include a tablet computer, a cell phone, a smart phone, a notebook computer, a terminal for digital broadcasting, a personal digital assistant (PDA), a portable multimedia player (PMP), or a navigation device. Again, there may be one or more other terminals not shown in FIG. 1, which may have the same type of user interface and the same possible implementations as the transmitting terminal 100 and the receiving terminal 200.

Referring to FIG. 1, the transmitting terminal 100 includes a service providing unit 110, an IP address managing unit 120, a control unit 140, and a Wi-Fi Host AP 150. The receiving terminal 200 includes a service providing unit 210, an IP address managing unit 220, an application execution unit 230, a control unit 240, and a Wi-Fi client unit 250.

The service providing units 110 and 210 of the transmitting terminal 100 and the receiving terminal 200, respectively, provide at least one application configured to perform a certain kind of task, an application program, a service, etc. For example, if the transmitting terminal 100 is a video recording device such as a camera and the receiving terminal 200 is a smart phone, the application may be a mobile link application, a remote view finder application, or an auto share application.

According to this embodiment, the transmitting terminal 100 may access the receiving terminal 200 by executing the mobile link application supported by the service providing unit 110, and also may transmit photos or videos stored therein to the receiving terminal 200.

In addition, when the transmitting terminal 100 executes the remote view finder application supported by the service providing unit 110, the receiving terminal 200 (the smart phone) may perform a remote control function and turn on or off a shooting button on the transmitting terminal 100 (the camera).

Also, when the transmitting terminal 100 executes the auto share application, the transmitting terminal 100 (the camera) is connected to the receiving terminal 200 (the smart phone), and whenever the transmitting terminal 100 (the camera) records a video, the video is transmitted to the receiving terminal 200 (the smart phone).

The application provided by the service providing units 100 and 210 may execute various tasks such as a function, a module, a menu, an application, and a widget. The expression "an application provided by the service providing unit" covers all tasks described above.

The IP address managing units 120 and 220 of the transmitting terminal 100 and the receiving terminal 200, respectively, assign a distinct IP address to each application provided by the service providing units 110 and 210, respectively, and store mapping information regarding the application and the assigned IP address.

For instance, the IP address managing units 120 and 220 assign the IP address "192.168.101.1" to the mobile link application. Also, the IP address managing units 120 and 220 assign the IP address "192.168.102.1" to the remote view finder and the IP address "192.168.103.1" to the auto share application.

The transmitting terminal 100 and the receiving terminal 200 share the IP address managing units 120 and 220. For example, if the transmitting unit 100 executes the mobile link application, the receiving terminal 200 may be implemented to instantly execute the mobile link application corresponding to the IP address "192.168.101.1" if the receiving terminal 200 accesses the IP address "192.168.101.1"

In detail, if the transmitting terminal 100 executes a certain application, the Wi-Fi Host AP unit 150 identifies the IP address corresponding to the certain application through the IP address managing unit 120 and performs a Wi-Fi Host AP function by using the identified IP address. Then, the Wi-Fi Host AP unit 150 is required to wait for an access of at least one receiving terminal 200 to the Host AP.

The receiving terminal 200 searches for an accessible Wi-Fi Host AP, identifies a Service Set Identifier (SSID) and the IP address of the results of the search for the Wi-Fi Host AP, and then accesses a certain Host AP identified by the receiving terminal 200. After accessing the certain Host AP, the receiving terminal 200 identifies whether the IP address managing unit 220 has an application corresponding to the IP address. If an application corresponding to the IP address is identified, the application execution unit 230 executes the application immediately.

According to another embodiment, a terminal may be configured by using a distinct address or identification information of each communication method, other than the Wi-Fi address. In this regard, a communication address managing unit 183A (FIG. 4) may assign a communication identification address identifying each application and store mapping information regarding the application and the assigned identification address. Also, after configuring a communication Host AP unit and a communication client unit, when a certain application is selected, the communication Host AP unit may configure a function thereof by using the communication identification address corresponding to the certain application selected by the communication address managing unit. The communication client unit searches for an accessible communication address, identifies the communication identification addresses from the search (identifying each communication Host AP) and accesses a certain communication Host AP unit.

Referring to FIG. 2, a flow for automatically executing an application by using an IP address in the transmitting terminal 100 and the receiving terminal 200 is described below. In this regard, the transmitting terminal 100 and the receiving terminal 200 may have a structure identical to the structure of FIG. 1.

A user selects a certain application in the transmitting terminal 100 in operation S210. The application may be implemented in the transmitting terminal 100 in various ways such as a menu, an application program, a module, or a widget.

In operation S212, if the user selects a certain application, the IP address managing unit 120 of the transmitting terminal 100 searches for the IP address corresponding to the selected application. Then, a Wi-Fi Host AP function is executed by using the located IP address in operation S214.

In operation S220, an accessible Wi-Fi Host AP is searched for in the receiving terminal 200. After checking the SSID and the IP address of the Wi-Fi Host AP, an access to the Host AP is performed in operation S222.

The IP address managing unit of the receiving terminal 200 searches for information related to an application corresponding to the IP address of the accessed Host AP in operation S224. If information related to an application corresponding to the IP address of the accessed Host AP is found, the control unit 240 of FIG. 1 or the application execution unit 230 of FIG. 1 executes the application and provides Wi-Fi communication in operation S226.

If no information related to an application corresponding to the IP address of the accessed Host AP is found, only Wi-Fi communication is provided in operation S225.

According to another embodiment, during the searching for an accessible Wi-Fi Host AP or a function that allows wired and wireless communication in the receiving terminal 200, the transmitting terminal 100 may execute the application corresponding to the application executed in the receiving terminal 200 if a function that allows Wi-Fi or wired and wireless communication is turned on in the transmitting terminal 100.

Referring to the description of FIG. 1, the receiving terminal 200 executes the mobile link application to which the IP address "192.168.101.1" is assigned. When the Host AP corresponding to the IP address "192.168.101.1" is found while searching for an accessible Wi-Fi Host AP, the transmitting terminal 100 may be accessed. The control unit 140 of FIG. 1 of the transmitting terminal 100 may be configured to search for the application corresponding to the IP address "192.168.101.1" through the IP address managing unit 120 of FIG. 1, and to execute the application.

According to another embodiment, the transmitting terminal 100 and the receiving terminal 200 may access each other through near field communication (NFC).

For example, when the transmitting terminal 100 is a camera and the receiving terminal 200 is a smart phone, the camera may access the smart phone through NFC, and the smart phone may determine a function performed by the camera.

The camera may also determine an access of the smart phone through NFC. When the camera determines that an access by the smart phone has occurred and the camera is in a shooting mode, the control unit 140 of FIG. 1 of the camera may determine that a user of the camera wants to connect to the smart phone to execute an auto share application on the camera, and then the auto share application is executed on the camera.

When the camera executes the auto share application, the camera generates a Host AP by using the IP address (192.168.103.1) assigned to the auto share application.

Meanwhile, the smart phone executes an application that may communicate with the camera through NFC. The executed application recognizes the IP address of the Host AP supported by the camera and performs NFC communication.

When the camera is in a recording mode and accesses the smart phone, the auto share application or the remote view finder application may be executed.

The mobile link application may be executed when the camera is in a thumbnail mode from among a plurality of playing modes of the camera. If a single video is played on the camera, the mobile link application may be executed, and a function for transmitting one picture from among mobile link functions may be implemented.

Figure 3:
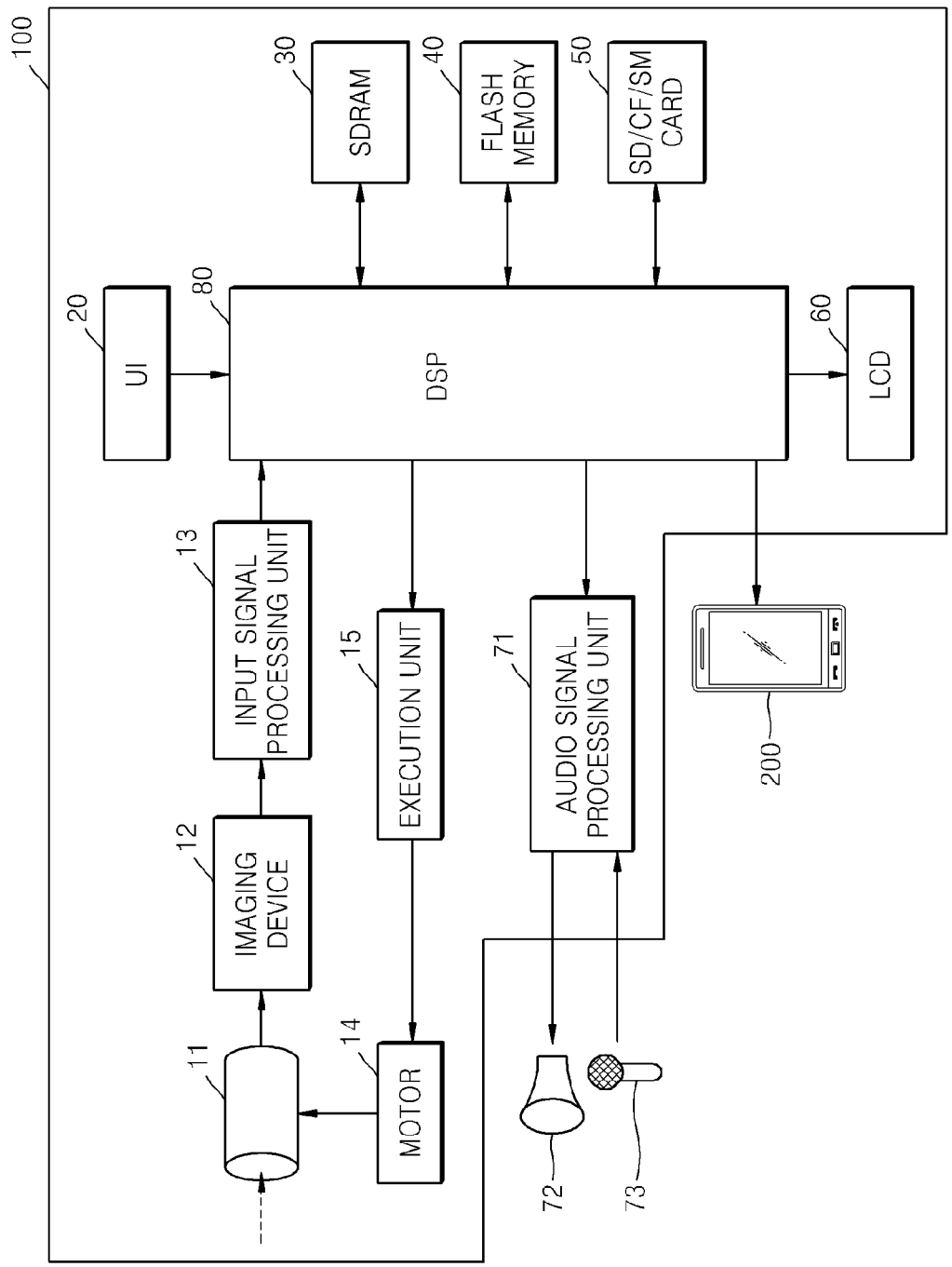
FIG. 3 is a schematic view describing an inside of a terminal, according to an embodiment.

FIG. 3 is a schematic view describing an inside of a terminal, according to an embodiment. An example of the terminal described in FIG. 3 may be a photographing apparatus such as a digital camera.

Referring to FIG. 3, the digital camera 100 includes an optical unit 11 that inputs an optic signal from an object, an imaging device 12 that converts the optic signal inputted by the optical unit 11 into an electric signal, and an input signal processing unit 13 that reduces noise generated by the electric signal provided by the imaging device 12 and that performs a signal processing such as a conversion to a digital signal.

Also, the digital camera 100 includes a motor 14 that actuates the optical unit 11 and an execution unit 15 that controls an operation of the motor 14. The digital camera 100 may further include a user input unit (UI) 20 that inputs a control signal of a user, a synchronous dynamic random access memory (SDRAM) 30 that temporarily stores data of an input image, data for processing and processing results, a flash memory 40 that stores an algorithm necessary for operations of the digital camera 100 and setting data, and a SD/CF/SM card 50 as a recording device that stores an image file. The digital camera 100 has also includes a liquid crystal display (LCD) 60.

In addition, the digital camera 100 further includes an audio signal processing unit 71 that converts sound into digital signals or analogue signals into digital signals of sound sources and produces audio files, a speaker 72 that outputs sound, a microphone 73 that inputs sound, and a digital signal processing unit (DSP) 80 that controls overall operations of the digital camera 100.

The optical unit 11 may include lenses for collecting optic signals, an iris for regulating the amount of optic signals (the amount of light) and a shutter for controlling an input of optic signals. The lenses may include a zoom lens for adjusting a field of view according to a focal length and a focus lens for focusing the lens with respect to an object. The lenses may include a signal lens or one group having a plurality of lenses. The shutter may be a mechanical shutter wherein a shield moves upward and downward. Alternatively, controlling supply of the electric signals to the photographing apparatus 11 may work as a shutter.

The motor 14 that actuates the optical unit 11 may also move a lens to a new location, open and close an iris, and release a shutter for auto-focusing, adjustment for automatic exposure, adjustment of the iris, zoom and change in the focus.

The motor 14 is controlled by the execution unit 15. The execution unit 15 controls the motor 14 according to control signals inputted by DSP 80.

The imaging device 12 receives the inputted optic signals from the optical unit 11 and forms an image of an object. The imaging device 12 may be a complementary metal oxide semiconductor (CMOS) sensor array or a charge coupled device (CCD) sensor array.

The input signal processing unit 13 may include an analogue-digital (A/D) converter that converts the electric signals provided by a charge coupled device (CCD) into a digital form. Also, the input signal processing unit 13 may have a circuit for a signal processing to normalize a gain adjustment or a wave form related to the electric signals provided by the imaging device 12.

The UI 20 may include components for performing various settings when a user operates the digital camera 10 or takes a photo or a video. For example, the components may be configured as a button, a touch panel, a touch screen or dials, and input control signals of the user such as turning on/off power, starting/stopping shooting, starting/stopping/searching a play, operating an optical system, converting modes, and manipulating a menu or selection.

The SDRAM 30 may temporarily store raw data (RGB data) of an image provided by the input signal processing unit 13, and according to an operation of the DSP 80, the temporarily stored raw data may process predetermined image signals, or be transmitted to another units that requires the temporarily stored raw data.

The flash memory 40 may store an operating system (OS) necessary to operate the digital camera 100, an application program and the data for executing an algorithm of a control method related to embodiments of the invention. The flash memory 40 is nonvolatile memory and may be read only memory (ROM).

An image file produced after image data provided by the input signal processing unit 13 is compressively processed may be recorded in the SD/CF/SM card 50. Examples of the SD/CF/SM card 50 may be a hard disk driver (HDD), an optical disk, an optical magnetic disk, and a hologram memory.

The LCD 60 may display in real time an image corresponding to the image data provided by the input signal processing unit 13, or display an image corresponding to the image data restored from the image file stored in the SD/CF/SM card 50. Although the LCD 60 is disclosed herein, the various embodiments of the invention are not limited thereto. Thus, for example, an organic electroluminescent display device or an electrophoretic display device may be used instead of the LCD 60.

The audio signal processing unit 71 converts the digital signals of the sound sources provided by the DSP 80 into sound, amplifies the sound, and transmits the sound to the speaker 72 to output the sound. Also, the audio signal processing unit 71 inputs the sound through a microphone 73, converts the sound into digital signals, and compresses the converted digital signals to generate an audio file. The sound may also be transmitted to the DSP 80 to perform sound processing.

The DSP 80 reduces noise generated in the inputted image data and performs an image signal processing such as gamma correction, color filter array interpolation, color matrix, and color correction and color enhancement.

The DSP 80 may also perform a clarity enhancement process, a coloring process, a blurring process, a sharpening process, an image analysis process, an image recognition process, and an image effect process. The DSP 80 may also perform image signal processing for displaying an image signal on the LCD 60. For example, an adjustment of a brightness level, a color correction, a contrast adjustment, a screen division, a generation of a character image and, a composition of a motion image may be performed in the DSP 80.

The DSP 80 may perform a predetermined image signal processing to display the image on an external terminal 200 by being connected to the external terminal 200. The processed image data is transmitted and the image may be displayed on the external terminal 200. The terminal 100 may be connected to communicate with the external terminal 200 in a wired of a wireless fashion through a mobile high-definition link (MHL), a high-definition multimedia interface (HDMI), or a ultra-wideband (UWB).

The DSP 80 plays an identical role with the control unit 140 of FIG. 1 of the transmitting terminal 100 of FIG. 1, performs an image signal processing as stated above, and controls each unit according to the processed results. Also, each unit may be controlled according to control signals of the user, which are inputted through the UI 20. An algorithm for processing the image signals may be stored in the flash memory 40 and converted to data executable for the processing. The converted algorithm is stored in the SDRAM 30, and the processing is performed in the DSP 80. Also, the DSP 80 may be controlled to display scenes detected during an image detecting mode.

Figure 4:
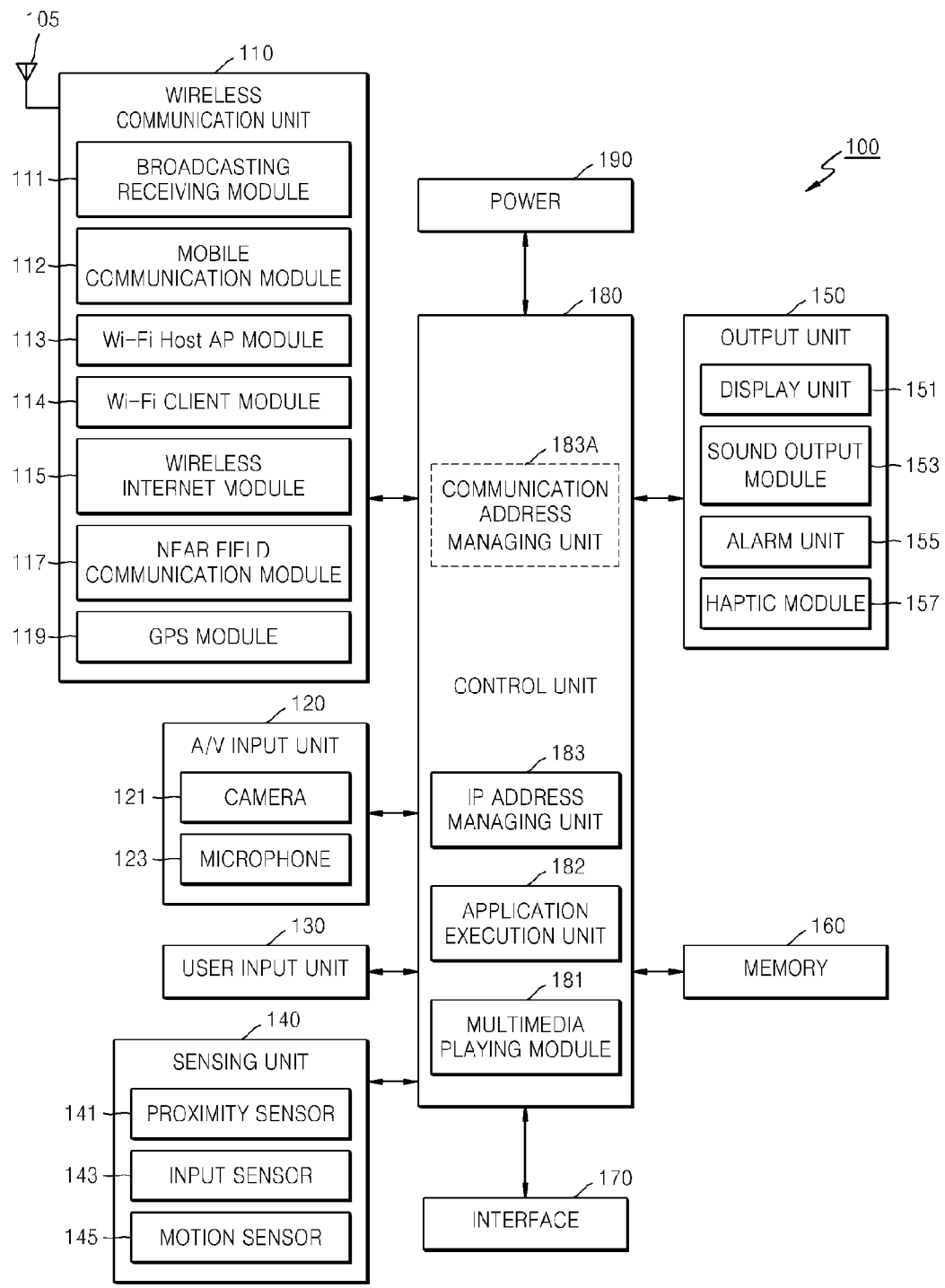
FIG. 4 is a schematic view of a terminal, according to another embodiment.

FIG. 4 is a schematic view of a terminal 100, according to another embodiment. Examples of the terminal of FIG. 4 may include a tablet computer, a cell phone, a smart phone, a notebook computer, personal digital assistants (PDA), a portable multimedia player (PMP) and a navigation device.

Referring to FIG. 4, the terminal 100 may include a wireless communication unit 110, an audio/video (A/V) input unit 120, a user input unit 130, a sensing unit 140, an output unit 150, a memory 160, an interface 170, a control unit 180, and a power supplying unit 190. According to necessity, the components stated above may be implemented into a singular or combined manner.

The wireless communication unit 110 may include a broadcasting receiving module 111, a mobile communication module 112, a Wi-Fi Host AP unit 113, a Wi-Fi client 114, a wireless Internet module 115, a near field communication (NFC) module 117, and a global position system (GPS) module 119.

The broadcasting receiving module 111 may receive at least one of broadcasting signals and broadcasting-related information from an external broadcasting managing server through a broadcasting channel. The broadcasting signals and/or the broadcasting-related information received by the broadcasting receiving module 111 may be stored in the memory 160.

The mobile communication module 112 transmits and receives wireless signals to and from at least one of a base station, an external terminal, and a server via a mobile communication network. The wireless signals may include various types of data such as voice signals, video signals, or transmission of texts/multimedia messages.

The wireless Internet module 115 is a module for accessing the Internet in a wireless manner. The wireless Internet module 115 may be installed inside or outside the terminal 100. Wireless LAN (WLAN), Wi-Fi, wireless broadband (Wibro), world interoperability for microwave access (Wimax) or High Speed Downlink Packet Access (HSDPA) may be used to access the Internet.

The descriptions related to the Wi-Fi Host AP module 113 and the Wi-Fi client module 114 may be understood from the descriptions of FIGS. 1 and 2. The Wi-Fi Host AP module 113 and the Wi-Fi client module 114 may be combined with the wireless Internet module 115.

The near field communication module 117 is a module for near field communication. Bluetooth, Radio Frequency Identification (RFID), infrared Data Association (IrDA), ultra wideband (UWB), ZigBee and NFC may be used for the near field communication.

The GPS module 119 receives location information from a plurality of GPS satellites.

The A/V input unit 120 may be used for inputting audio signals or video signals and may include a camera 121 and a microphone 123. The camera 121 may process static images or moving images acquired by an image sensor during a video call mode or a shooting mode. The processed static or moving images may be displayed on a display unit 151.

The static or moving images processed in the camera 121 may be stored in the memory 160 or transmitted to the outside through the wireless communication unit 110. The camera 121 may be more than two cameras according to the structure of the terminal 100.

The user input unit 130 generates key input data for controlling the operations of the terminal 100. According to the embodiment, a user may receive an input related to a selection of a certain application through the user input unit 130. The user input unit 130 may be a key pad for receiving commands or information based on a push or an action of a touch of the user, a dome switch, and a touch pad (pressure-sensitive/electrostatic types).

The display unit 151 displays and outputs information processed in the terminal 100. For example, if the terminal 100 is in a call mode, the display unit 151 displays a user interface (UI) or a graphic user interface (GUI) regarding calls. If the terminal 100 is in a video call mode or a recording mode, the display unit 151 may separately and simultaneously display a recorded or received image, and also display the UI or the GUI.

The memory 160 may store a program for processing and controlling of the control unit 180 and perform a function for temporarily storing inputted or outputted data such as a phone contact list, messages, static images or moving images.

The control unit 180 controls overall operations of the terminal 100 by conventionally controlling operations of each unit. For instance, the control unit 180 controls or processes video recording, voice calls, data communication, or video calls. Also, the control unit 180 may have a multimedia playing module 181 for playing multimedia, an IP address managing unit 183 for assigning distinct IP address information to each application supported by the terminal 100 and storing the assigned IP address, and an application execution unit 182 for executing or stopping execution of the application supported by the terminal 100. The multimedia playing module 181, the IP address managing unit 183, and the application execution unit 182 may be realized as hardware of the control unit 180 or as software separate from the control unit 180.

The methods and apparatuses disclosed herein can also be embodied as processor readable codes on a processor readable recording medium installed in a portable terminal. The processor readable recording medium is any data storage device that can store data which can be thereafter read by a processor. Examples of the processor readable medium include read-only memory (ROM), random-access memory (RAM), CD-ROMs, magnetic tapes, floppy disks, optical data storage devices, etc. The processor-readable medium can also be distributed over network coupled computer systems so that the processor readable codes are stored and executed in a distributed fashion.

While one or more embodiments of the have been described with reference to the figures, it will be understood by those of ordinary skill in the art that various changes in form and details may be made therein without departing from their spirit and scope of as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A terminal comprising:
    a service providing unit that provides an application;
    an Internet Protocol (IP) address managing unit that assigns a distinct IP address identifying the application and stores mapping information regarding the application and its assigned IP address; and
    a communication unit configured to operate as a Wi-Fi Host Access Point (AP) unit or as a Wi-Fi client unit, wherein
    when the communication unit operates as a Wi-Fi Host AP unit and the application is selected, the communication unit uses the IP address assigned to the application to perform a WiFi host AP function; and
    when the communication unit operates as a Wi-Fi client unit, the communication unit searches for an accessible Wi-Fi Host AP; identifies a service set identifier (SSID) and an IP address of a Wi-Fi Host AP; and accesses the Wi-Fi Host AP.

2. The terminal of claim 1, further comprising an application executing unit, wherein when the communication unit operates as a Wi-Fi client unit, and the accessed Wi-Fi Host AP uses an IP address that the Wi-Fi client identifies as an IP address corresponding to an application, the application executing unit executes the application.

3. The terminal of claim 1, further comprising an application executing unit, wherein when the communication unit operates as a Wi-Fi client unit, and the accessed Wi-Fi Host AP uses an IP address that the Wi-Fi client unit does not identify as an IP address corresponding to an application, the terminal provides Wi-Fi communication.

4. The terminal of claim 1, wherein the application includes at least one of a mobile link application, a remote view finder application, and an auto share application.

5. The terminal of claim 1, wherein
    the application is one of a plurality of applications provided by the service providing unit; and
    the IP address managing unit assigns a distinct IP address to each of the plurality of applications.

6. A terminal comprising:
    a service providing unit that provides an application;
    a communication address managing unit that assigns a distinct communication address identifying the application and stores mapping information regarding the application and its assigned communication address; and a communication unit configured to operate as a communication Host Access Point (AP) unit or as a communication client unit, wherein when the communication unit operates as a communication Host AP unit and the application is selected, the communication unit uses the communication address assigned to the application to perform a Host AP function; and when the communication unit operates as a communication client unit, the communication unit searches for an accessible communication Host AP; identifies communication identification addresses of communication Host APs from the results of the search; and accesses a certain communication Host AP.

7. The terminal of claim 6, further comprising an application executing unit, wherein when the communication unit operates as a communication client unit, and the accessed communication host AP uses a communication address that the communication client identifies as a communication address corresponding to an application, the application executing unit executes the application.

8. A system for executing an application installed in a terminal by using an Internet protocol (IP) address, the system comprising:

a plurality of terminals;

a service providing unit that provides at least one application; and an IP address managing unit that assigns a distinct IP address identifying respective applications and stores mapping information regarding the application and the assigned IP address; wherein a first terminal among the plurality of terminals configures a Wi-Fi Host (Access Point) AP function by using an IP address corresponding to a certain application selected by the IP address managing unit when the certain application is selected from the at least one application provided by the service providing unit; and the least one terminal of the plurality of terminals, excluding the first terminal, searches for an accessible Wi-Fi Host AP, accesses a certain Host AP after identifying a service set identifier (SSID) and an IP address of the searched Wi-Fi Host AP, and, if the IP address managing unit has information related to an application corresponding to the IP address of the certain Host AP, provides Wi-Fi communication while executing the application corresponding to the IP address of the certain Host AP.

9. The system of claim 8, wherein the certain Host AP is a Wi-Fi Host AP configured by the first terminal.

10. The system of claim 8, wherein the application is at least one of a mobile link application, a remote view finder application, and an auto share application.

11. A method for automatically executing an application by using an Internet protocol (IP) address in a transmitting terminal and a receiving terminal, wherein each of the transmitting terminal and the receiving terminal comprise an IP address managing unit that provides at least one application configured to perform a certain task, supports Wi-Fi communication, assigns a distinct IP address identifying each of the at least one application, and stores mapping information regarding the application and the assigned IP address, the method comprising:

selecting a certain application from the at least one application provided by the transmitting terminal;

searching for an IP address corresponding to the application selected in the transmitting terminal, wherein the searching is performed by the IP address managing unit;

configuring a Wi-Fi Host Access Point (AP) function by using the IP address searched in the transmitting terminal;

searching for an accessible Wi-Fi Host AP in the receiving terminal;

accessing the configured Wi-Fi Host AP in the transmitting terminal after identifying a service set identifier (SSID) and an IP address of the Wi-Fi Host AP searched in the receiving terminal; and providing Wi-Fi communication while executing an application corresponding to an IP address of the accessed Host AP, if the IP address managing unit has information related to the application corresponding to the IP address of the accessed Host AP.

12. The method of claim 11, wherein the receiving terminal is one of a plurality of receiving terminals.

13. The method of claim 11, wherein the application is at least one of a mobile link application, a remote view finder application, and an auto share application.

* * * * *